United States Patent
Condon et al.

(10) Patent No.: US 6,427,888 B1
(45) Date of Patent: Aug. 6, 2002

(54) VEHICLE ROOF TOP LUGGAGE HOLDER

(75) Inventors: Alan Condon, East Hanningfield; Stephen John Sykes, Brentwood, both of (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/641,309

(22) Filed: Aug. 18, 2000

(30) Foreign Application Priority Data

Aug. 18, 1999 (GB) .............................. 9919402

(51) Int. Cl.⁷ .............................................. B60R 9/042
(52) U.S. Cl. ........................ 224/310; 414/462; 224/553
(58) Field of Search ................. 224/309, 310, 224/553; 414/462

(56) References Cited

U.S. PATENT DOCUMENTS

| | | | |
|---|---|---|---|
| 3,064,841 A | * | 11/1962 | Ellington |
| 4,240,571 A | * | 12/1980 | Ernst .......................... 224/310 |
| 4,291,823 A | * | 9/1981 | Freeman et al. ............ 224/310 |
| 4,565,482 A | * | 1/1986 | Baker ........................ 414/462 |
| 4,682,719 A | * | 7/1987 | Ernst et al. ................. 224/310 |
| 5,649,655 A | * | 7/1997 | Kerner ....................... 224/310 |
| 5,690,259 A | | 11/1997 | Montani |

* cited by examiner

*Primary Examiner*—Gregory M. Vidovich
(74) *Attorney, Agent, or Firm*—Gigette M. Bejin

(57) ABSTRACT

A vehicle roof top luggage holder comprising a roof track, a roof rack for receiving luggage, and a rear frame, the roof track extending generally to the fore and aft of the vehicle on the vehicle roof, with the roof rack being moveably mounted with respect to the roof track to the fore of the vehicle and pivotally attached to the rear frame at the aft of the vehicle, characterised in that the rear frame comprises a hinge arm connected pivotally to the rear of the roof rack and pivotally attached to the rear of the vehicle one of the rear frame and roof rack including a cross bar positioned essentially horizontally across the rear of the roof of the vehicle, the arrangement whereby the roof tf the hinge arm of the rear frame, to the rear of the vehicle, enabling loading and unloading of the roof rack at the rear of the vehicle.

3 Claims, 4 Drawing Sheets

VEHICLE ROOF TOP LUGGAGE HOLDER

FIELD OF THE INVENTION

The present invention relates to the field of vehicle roof top luggage holders.

BACKGROUND OF THE INVENTION

It is inconvenient and sometimes extremely difficult to have to lift heavy items onto and off a vehicle roof rack. This problem is increased when attempting to lift items onto and from higher roofed vehicles such as MPV's. It is known that rollers and track guides can be used to slide a roof rack along the vehicle roof and down the tailgate or front bonnet of the vehicle. This however involves the permanent fitting of the tracks onto the vehicle at manufacture. Access via the tailgate remains when the tracks are fitted to the front of the vehicle. However, when the tracks are fitted to the rear of the vehicle, access through the tailgate during luggage loading and unloading is impossible.

There also exist systems whereby bicycles are loaded and unloaded at the side of the vehicle and lifted to and from the roof. These require various attachments and are capable of lifting only one bicycle at a time, by manual or powered means.

SUMMARY OF THE INVENTION

According to the invention, a vehicle roof top luggage holder comprising a roof track, a roof rack for receiving luggage, and a rear frame, the roof track extending generally to the fore and aft of the vehicle on the vehicle roof, with the roof rack being moveably mounted with respect to the roof track to the fore of the vehicle and pivotally attached to the rear frame at the aft of the vehicle, characterised in that the rear frame comprises a hinge arm connected pivotally to the rear of the roof rack and pivotally attached to the rear of the vehicle, one of the rear frame and roof rack including a cross bar positioned essentially horizontally across the rear of the roof of the vehicle, the arrangement whereby the roof rack may swing down, facilitated by the leverage action of the hinge arm of the rear frame, to the rear of the vehicle, enabling loading and unloading of the roof rack at the rear of the vehicle. The system outlined in this invention allows the luggage to be loaded/unloaded at the rear of the vehicle, at a convenient height. It also allows for free access through the tailgate during loading/unloading. The tailgate itself can be used to lift the roof rack onto the roof, to save physical effort, alternatively the motion could be powered. The cross bar provides strength and rigidity and also may provide a useful handle for grabbing the rear area of the roof rack/rear frame to move it.

Preferably the pivotal attachment of the roof rack to the rear frame is constrained such that the roof rack to pivots about one axis only. This ensures the luggage holder is both stable and swings down for loading and unloading in a controlled and smooth running manner. The choice of the type of pivot used is left to the discretion of the skilled addressee of the specification.

Although possible for the rear frame to comprise only one central hinge arm, preferably it includes two parallel hinge arms both pivotally connected to the vehicle and the roof rack. This together with the cross bar serves to constrain the pivotal movement of the roof rack. The use of the invention allows the roof rack to swing down to the rear of the vehicle, improving the ease by which the roof rack can be loaded/unloaded. This is of particular use when loading heavy items or when used on MPV's and other vehicles of above average height. The preferred use of the invention is for use on estate vehicles and MPV's that have a rear hatch tailgate. The use on these vehicles allows for ease of mounting the rear frame onto the vehicle without obscuring the drivers rear view. However where the vehicle does not have a tailgate the rear frame can be mounted on the rear-most pillar of the vehicle in a position such that the drivers rear view is not impeded.

The swinging movement of the roof rack between the loading/unloading position and the storage position can be by manual or powered means. Where the invention is being used on a vehicle that has a tailgate, it is preferred that the loading/unloading position is substantially parallel to the vehicle tailgate If the vehicle does not have a tailgate it is suggested that the loading/unloading position is such that the roof rack is essentially horizontal. Both suggested positions are aimed at ensuring minimum effort is expended on the users part.

The roof rack itself can be easily adapted so that it can store any number of objects, such as bicycles allowing the loading of more than one at a time, ski equipment or large containers, the users of which particularly benefit from the ease of loading and unloading provided by this invention.

It is a preferred feature of this invention that the roof rack is secured in place on the roof of the vehicle in the storage position by use of a latch. The latch is located at the joint attaching the roof rack to the rear frame, preventing the slider moving along the roof tracks. For loading the vehicle, the latch is released to allow the free movement of the roof rack along the roof track.

The roof track itself can either be fixed as an integral part of the vehicle roof such that it takes the form a recess gutter in the vehicle roof. This method would largely be available to new vehicles only as it would be preferred that the gutter and track be formed at the production stage. However the track can be fitted to existing vehicles, post production, by the fixing of the tracks onto the vehicle roof.

The roof rack is connected to the roof track to allow for its smooth movement along the roof track. The movement of the roof rack along the roof track can be facilitated by a number of means for example rollers or sliders. Preferably the roof rack is slidably mounted with respect to the roof track.

The movement of the roof rack along the roof track can be achieved by manual or powered means. The movement of the roof rack along the roof of the vehicle forces the hinge arm of the rear frame to pivot about its attachment with the vehicle tailgate. The hinge arm then swings back out to the rear of the vehicle. The roof rack in turn pivots about its attachment with the rear frame, so as to be in a position that allows for easy loading/unloading of the roof rack. It is preferred that the pivot attachment of the hinge arm to both the vehicle and the roof rack are such that the movement of the rear hinge arm between the loading/unloading and storage position describes an arc. The loading/unloading position of the roof rack may be different for a vehicle that possesses a tailgate to one that does not. Where the vehicle has a tailgate it is preferred that the roof rack swings down to the rear of the vehicle to a position substantially parallel with the vehicle tailgate. This position couples the advantages of ease of luggage loading/unloading, with the retention of access through the tailgate when in the loading/ unloading position. It also has the added advantage of providing the option of using the tailgate itself to assist in returning the roof rack to the storage position. However when the vehicle does not have a tailgate it is suggested that the roof rack swings down to a substantially horizontal position at the rear of the vehicle.

Once the roof rack has been loaded and the luggage is secured in place the roof rack can be returned to its storage position on the vehicle roof. Pushing the hinge arm, either manually or by powered means, in an upward direction pivots the hinge arm back to the storage position. The roof rack also pivots back round about the rear frame joint. The fore of the roof rack runs along the roof track sliding the roof rack back into its substantially horizontal position on the vehicle roof. The rack is secured by closing the latch. An advantage of this invention is that where the vehicle has a tailgate the roof rack does not have to be in the storage position to gain access through the tailgate. If the roof rack is in the load/unload position, the tailgate can be opened as normal. When the tailgate is opened it lifts the roof rack with it owing to its attachment thereto and the use of flexible pivotal joints. To continue loading/unloading the roof rack the tailgate is simply closed. This brings the roof rack back down to the loading/unloading position. This feature is of particular use with the manual version of the roof rack system. For very heavy items where a considerable force may be required to swing the hinge arm back upwards to the storage position, the vehicle tailgate could be used as a form of lifting device for pushing the hinged arm upwards and the roof rack back onto the vehicle roof.

BRIEF DESCRIPTION OF THE DRAWINGS

The invention will now be described further, by way of example only, with reference to the accompanying drawings, in which.

DETAILED DESCRIPTION OF THE PREFERRED EMBODIMENT

Figure 1:
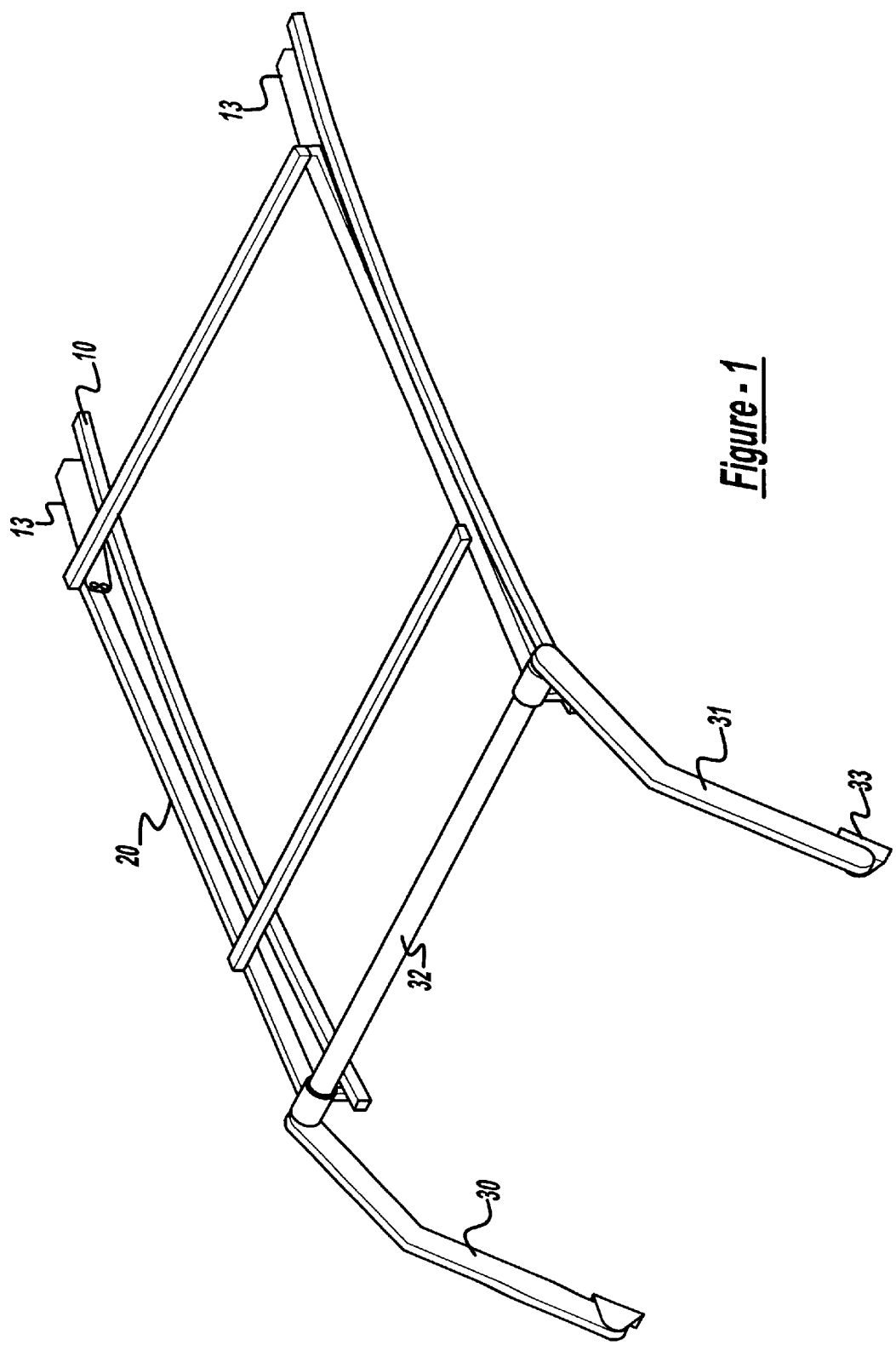
FIG. 1 is a plan view of a luggage holder in accordance with the invention, the constituent parts and how they are assembled.

A vehicle roof top luggage holder comprises a roof track 10, a roof rack 20 for receiving luggage, and a rear frame 30. The roof track 10 extends generally to the fore and aft of the vehicle on the vehicle roof. The roof rack 20 is moveably mounted with respect to the roof track 10 to the fore of the vehicle and pivotally attached to the rear frame 30 at the aft of the vehicle. The rear frame 30 comprises an arm 31, the hinge arm 31 being connected pivotally to the rear of the roof rack 20 and pivotally attached to the rear of the vehicle, one of the rear frame 30 and roof rack 20 including a cross bar 32 positioned essentially horizontally across the rear of the roof of the vehicle, the arrangement whereby the roof rack 20 may swing down, facilitated by the leverage action of the arm 31 of the rear frame, to the rear of the vehicle, enabling loading and unloading of the roof rack at the rear of the vehicle.

Figure 2:
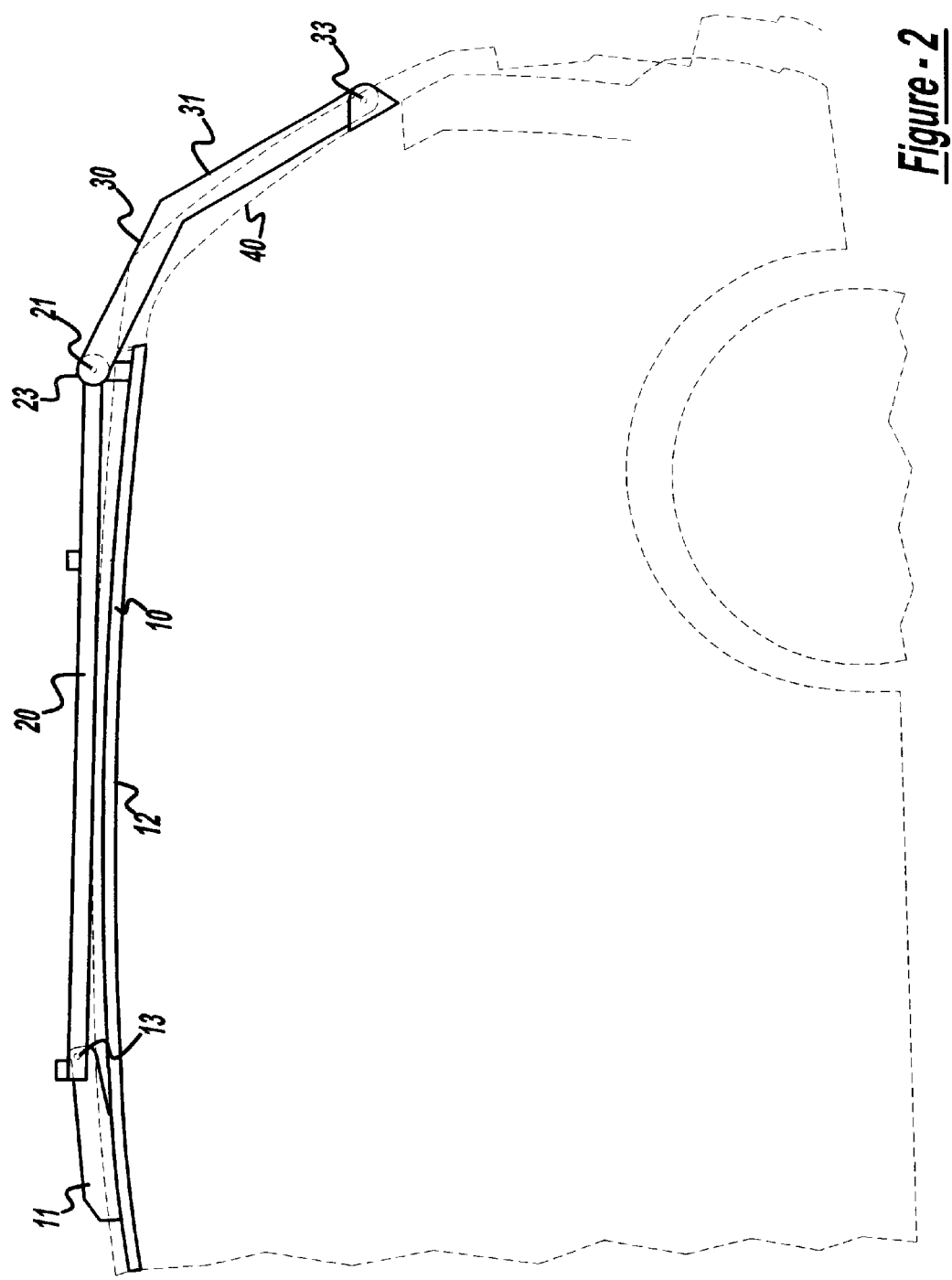
FIG. 2 shows the luggage holder of FIG. 1, with the latch secured, in the storage position as viewed from the side of the vehicle.

The luggage holder is secured on top of the vehicle roof 12 in the storage position, as is shown in FIG. 2. When lowered to the rear of the vehicle, FIG. 3, the luggage holder is in the loading/unloading position.

FIG. 1 and FIG. 2 indicate the embodiment of the luggage holder in the storage position. FIG. 1 shows the constituent parts of the luggage holder and how they are attached. FIG. 2 indicates how the luggage holder is fitted onto a vehicle, using as an example an estate vehicle that has a tailgate 40. The roof track 10 is fixed to the vehicle either as an integral part of the vehicle roof 12, or as a post manufacture attachment mounted by any of the known means onto the vehicle roof 12. A single track 10 situated in essentially the center of the vehicle roof 12, extending generally to the fore and aft of the vehicle can be used. However, it is the preferred embodiment of this invention to use two roof tracks 10 as can be seen in FIG. 1. The two tracks are positioned at either side of the vehicle roof 12 substantially parallel to each other, extending generally to the fore and aft of the vehicle. In the embodiment shown in FIGS. 1 and 2, sliders 11 are used to provide the smooth running movement of the roof rack 20 along the roof track 10. The sliders are mounted on the roof track 10 and attached to the roof rack 20 at the front of the vehicle by way of a moveable pin joint 13.

The roof rack 20 can take the form of the commonly used essentially square shaped frame on to which luggage can be mounted as is indicated in FIG. 1. It is also possible for the roof rack to be an integral roof top box and rack which is also a known luggage storing feature. The roof rack 20 is pivotally attached 23 towards the rear of the vehicle to the rear frame 30. The pivot attachment 23 of the roof rack 20 to the rear frame 30 is characterised in that the roof rack 20 is constrained to move about one axis. The movement of the roof rack 20 about the pivot 23 enables the roof rack 20 to swing round to be essentially parallel to the vehicle tailgate 40 when in the loading/unloading position, as can be seen most clearly in FIG. 3. This loading/unloading position enables the user to have the option of using the vehicle tailgate to lift raise the roof rack 20 back to the storage position.

The rear frame 30 is mounted to the rear of the vehicle on the vehicle tailgate 40 as is seen in FIG. 2. The rear frame comprises a hinge arm 31, joined to a cross bar 32 which is positioned horizontally across vehicle roof 12 and attached to the roof rack 20 by pivot 23. In practice the rear frame comprises two hinge arms 31, attached one at each end of the cross bar 32, FIG. 1. The use of more than one hinge arm 31 improves the lifting power and ensures the driver of the vehicle has a clear view from the rear of the vehicle at all times. The arm 31 is attached to the body of the vehicle pivotally on the rear tailgate 40. The pivot attachment 33 of the arm 31 to the vehicle tailgate 40 allows the hinge arm 31 to move in a manner that describes an arc during the raising and lowering of the roof rack 20 to and from the loading and storage positions, FIG. 3.

In the storage position the luggage container is held securely in place by use of a latch 21, which prevents the sliders 11 from moving along the roof tracks 10. For loading/unloading of the roof rack 20 the latch 21 is released, and a force is applied in the direction of the rear of the vehicle to the hinge arm 31 or the roof rack 20. The sliders 11 run along the roof track 10 in the direction of the rear of the vehicle. This movement pushes the rear frame 30 outwards from the rear of the vehicle. The hinge arm 31 pivots about its joint 33 on the vehicle tailgate 40 such that the hinge arm 31 and the cross bar 32 swing down in a movement that describes an arc, FIG. 3.

Figure 3:
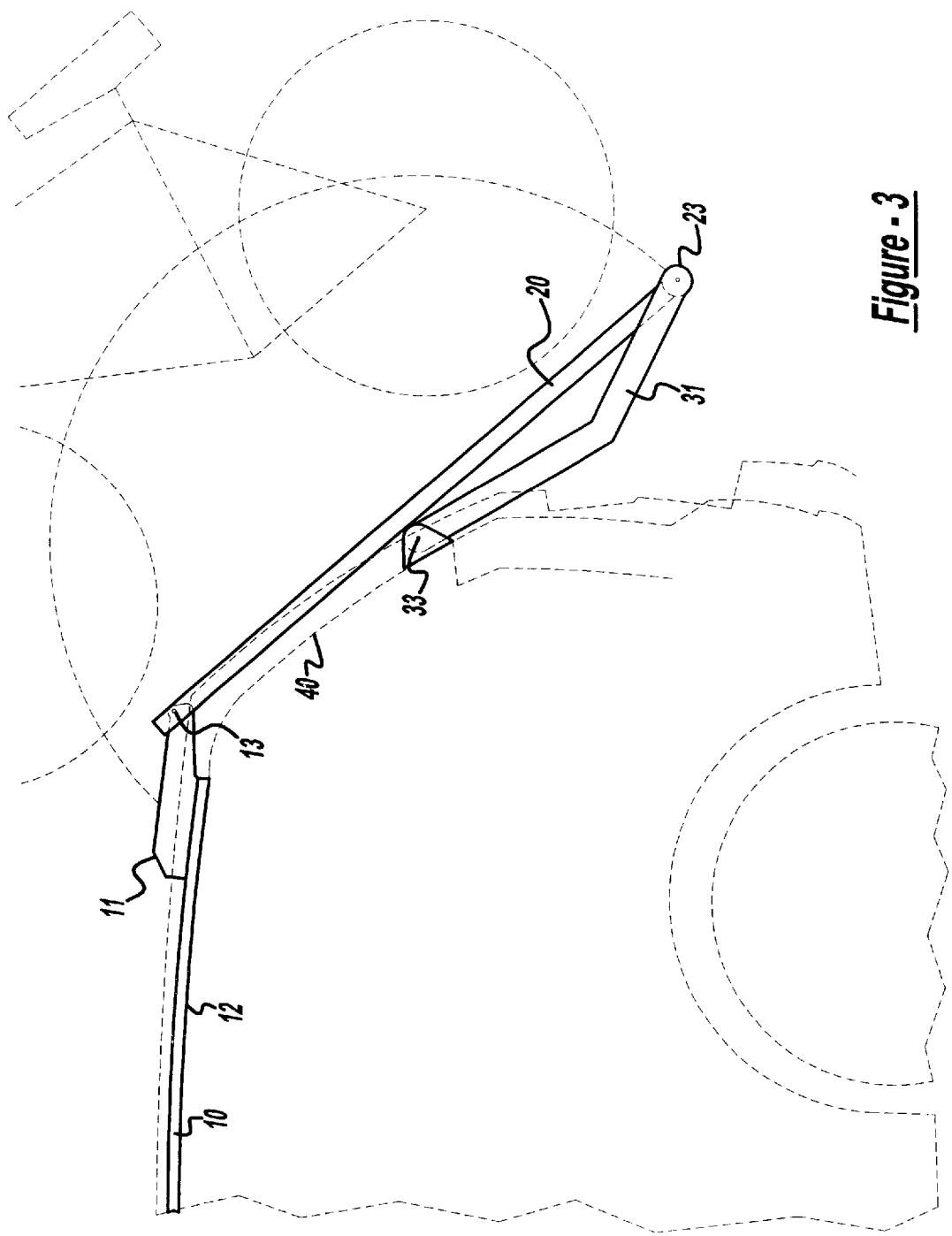
FIG. 3 is a sectional side elevation of the luggage holder in the load/unload position showing the path of the parallel arm of the rear frame.

The roof rack 20 pivots about its joint 23 with the cross bar 32 of the rear frame 30. This enables the roof rack 20 to swing down to the load/unloading position as shown in FIG. 3. Free access is maintained through the vehicle tailgate 40 when the roof rack is in the load/unloading position. If access is required through the vehicle tailgate 40, it is opened as normal. The roof rack is essentially resting on the vehicle tailgate 40. When the tailgate 40 is opened, it lifts the roof rack 20 up with it, out of the way to allow for access through the tailgate 40. The lowering of the tailgate 40 brings the roof rack 20 back to the load/unload position.

FIG. 3 also indicates how a cycle rack can be fixed to the roof rack enabling, if required, a plurality of bicycles to be loaded or unloaded at one time. The invention can be adapted in many ways for loading and storing of a variety of objects.

To raise the roof rack 20 back onto the storage position on the vehicle roof 12 as is seen in FIG. 2, a force is applied, either manually or by powered means to the hinge arm 31. This force pushes the hinge arm 31 upwards and back through a movement that describes an arc to its storage position. This movement of the hinge arm 31 forces the slider 11 to move along the roof track 10 towards the front of the vehicle. The roof rack 20 pivots back around its joint attachment 23 with the rear frame 30 to an essentially horizontal position, essentially parallel with the vehicle roof 12.

Figure 4:
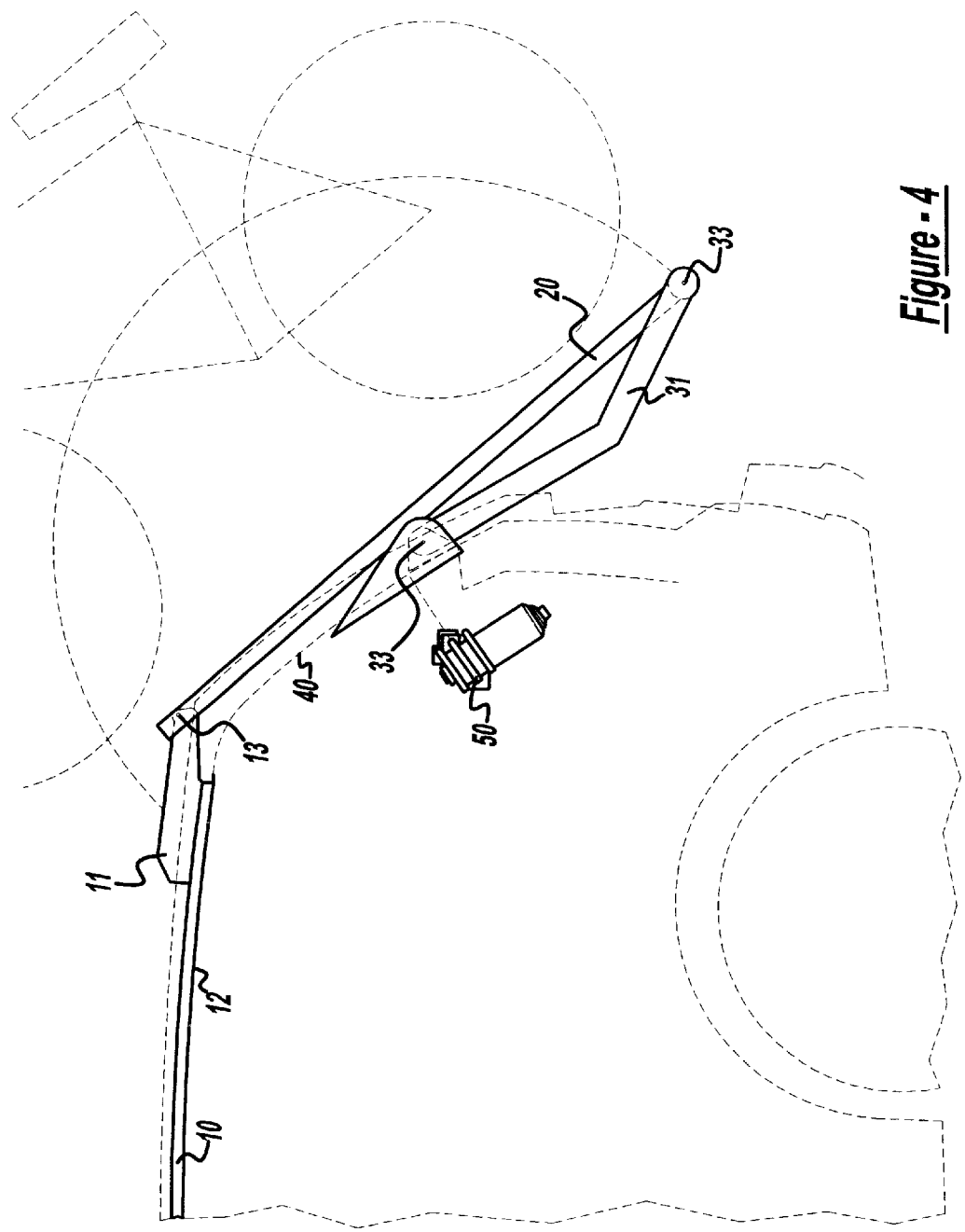
FIG. 4 is a similar view to FIG. 3 but shows how the luggage holder can be operated by powered means, and the suggested position of an electric motor as the powered means.

As outlined the movement of the roof rack along the roof track and in turn the motion of the arm can be by mechanical or powered means. FIG. 4 indicates how the invention might be operated by powered means, namely by use of an electric motor 50. The powering means can be positioned in a variety of locations. The preferred position of the powering means as indicated in FIG. 4 is connected to the pivot 33, positioned on the inside of the vehicle just behind the tailgate. This protects the powered means from both the weather and possible vandal attacks.

What is claimed is:

1. A roof top luggage holder for a vehicle comprising:

a roof track extending generally to the fore and aft of a vehicle roof;

a roof rack for receiving luggage, the roof rack being moveably mounted to the roof track to the fore of the vehicle; and a rear frame having a first and a second end, the first end being pivotally attached to the rear of the roof rack and the second end being pivotally attached to a vehicle rear liftgate whereby the rear frame pivots at the second end approximately 180 degrees about the vehicle rear liftgate and swings the roof rack from the top of the vehicle down to the rear of the vehicle for loading and unloading of the roof rack and;

a motor mounted at the second end of the rear frame providing for motorized roof rack deployment to the top of the vehicle when the vehicle tailgate when the tailgate is closed by motorizing the pivoting of the rear frame upward at the second end of the rear frame.

2. The roof top luggage holder of claim 1 wherein a forward end of the roof rack being moveably mounted to the roof track by a slider mechanism, the slider mechanism being pivotally connected to the roof rack and slidably connected to the roof track.

3. The roof top luggage holder of claim 1 wherein the roof rack, when positioned down to the rear of the vehicle, is lifted upwardly when the vehicle tailgate is opened.

* * * * *